INVENTORS
DAVID A. ESPEN
ARLAND I. OLAFSON
RICHARD K. RADTKE
BY

*HP Ferry*
ATTORNEY

INVENTORS
DAVID A. ESPEN
ARLAND I. OLAFSON
RICHARD K. RADTKE
BY
ATTORNEY

United States Patent Office 3,543,124
Patented Nov. 24, 1970

3,543,124
OVERLOAD AND FAILURE SENSING CIRCUIT HAVING DUTY CYCLE CURRENT LIMITING FOR SYNCHRO DATA TRANSMITTING AND RECEIVING APPARATUS
David A. Espen and Arland I. Olafson, Phoenix, Ariz., and Richard K. Radtke, Newbury Park, Calif., assignors to Sperry Rand Corporation, a corporation of Delaware
Filed June 14, 1968, Ser. No. 737,117
Int. Cl. G05b 9/02
U.S. Cl. 318—691
6 Claims

ABSTRACT OF THE DISCLOSURE

A circuit for sensing overload and failure conditions with respect to synchro data transmitting and receiving apparatus for providing duty cycle current limiting during overload and discrete failure monitoring in the event of failure.

BACKGROUND OF THE INVENTION

Field of the invention

The present invention pertains to a protective circuit for automatically and discretely sensing overload and failure conditions and which provides duty cycle current limiting during overload.

Description of the prior art

Prior art circuit protective devices of the type utilized with synchro data transmitting and receiving apparatus merely sensed malfunction conditions and rendered the entire system inoperative until the malfunction condition was corrected externally by other means. This resulted in the complete system being inoperative during the entire time the malfunction existed. Further, prior art systems are generally incapable of providing a discrete indication between various types of malfunctions such as overload conditions and loss of power. In addition, prior art protective systems lack any provision for permitting the system to operate during overload for a portion of the normal operating time which also takes into consideration the mechanical characteristics of the system components whereby the electronic components are protected while the mechanical characteristics of the system components are utilized to achieve the desired result such as alignment between the synchro transmitter and the synchro receiver.

SUMMARY OF THE INVENTION

The present invention is generally utilized between a synchro transmitter and a synchro receiver for providing discrete indications of the overload and failure thereof. In the overload mode, a duty cycle current limiting means acts as a current sensitive electronic switch which opens when the current being drawn by the power amplifiers disposed between the transmitter and receiver exceeds a preselected threshold valve for a defined time period. The switch is then caused to cycle at a predetermined rate consistent with protection of the electronic components while taken into consideration the inertia characteristics of the rotor of the receiver in order that the receiver continues to follow-up in a direction to align itself with the transmitter during overload at substantially the same rate as it would under normal conditions. Thus, the duty cycle current limiting arrangement of the present invention is designed with the inertia associated with the mass of the positionable member, i.e., the rotor of the receiver and any elements attached thereto, taken into consideration to provide a very efficient peak torque to power input ratio. The circuit of the present invention is also responsive to an absence of power through the transmitter-receiver system to provide a discrete indication in accordance therewith.

DESCRIPTION OF THE PREFERRED EMBODIMENT

Figure 1:
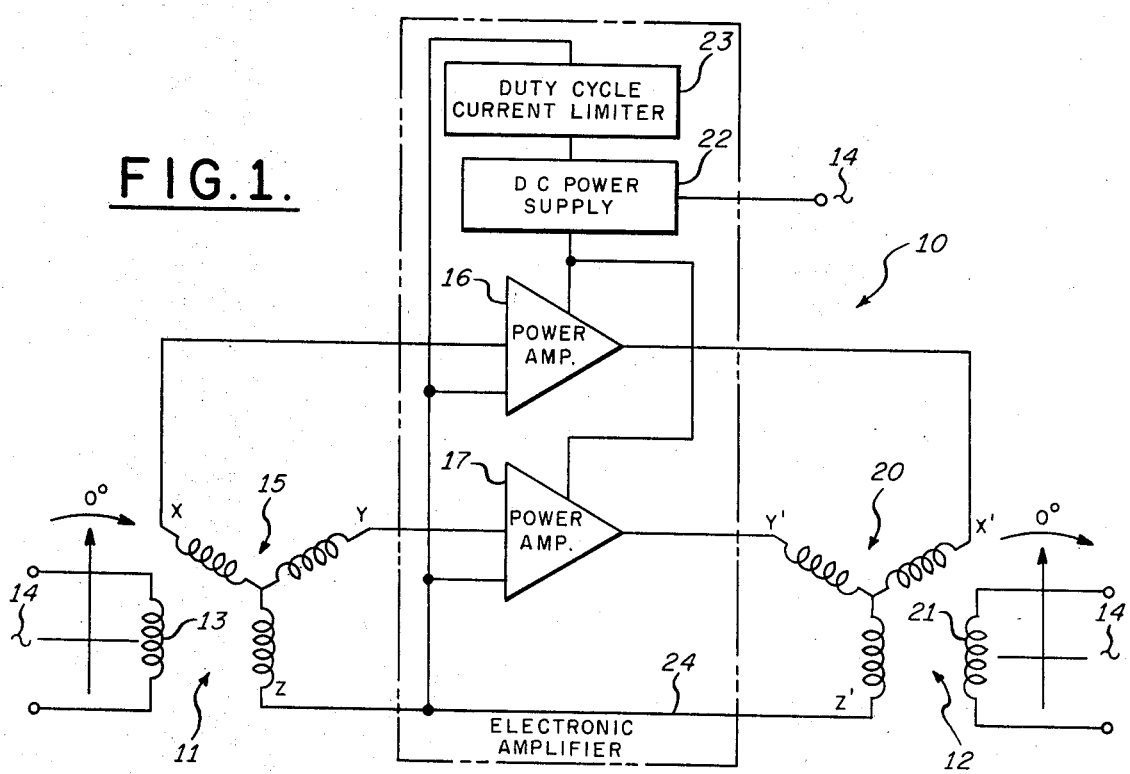
FIG. 1 is a schematic diagram partially in block form of a synchro data transmitting and receiving apparatus incorporating the overload and failure sensing circuitry of the present invention.

An overload and failure sensing circuit in accordance with the present invention is shown in FIG. 1 utilized with respect to a synchro data transmitting and receiving system 10 having a transmitter 11 and a receiver 12. The transmitter 11 consists of a rotor winding 13 responsive to a suitable excitation source 14, for example 115 volts A.C. The transmitter 11 further includes Y connected stator windings 15 which has its X and Y terminals connected through respective power amplifiers 16 and 17 to corresponding X' and Y' terminals of the Y connected stator windings 20 of the receiver 12. The Z terminal of the stator windings 15 of the transmitter 11 is directly connected to the corresponding Z' terminal of the receiver 12 via a lead 24. The receiver 12 further includes a positionable rotor winding 21 responsive to the excitation source 14. A power supply 22 is also responsive to the excitation source 14 to provide D.C. power to the power amplifiers 16 and 17.

Figure 2:
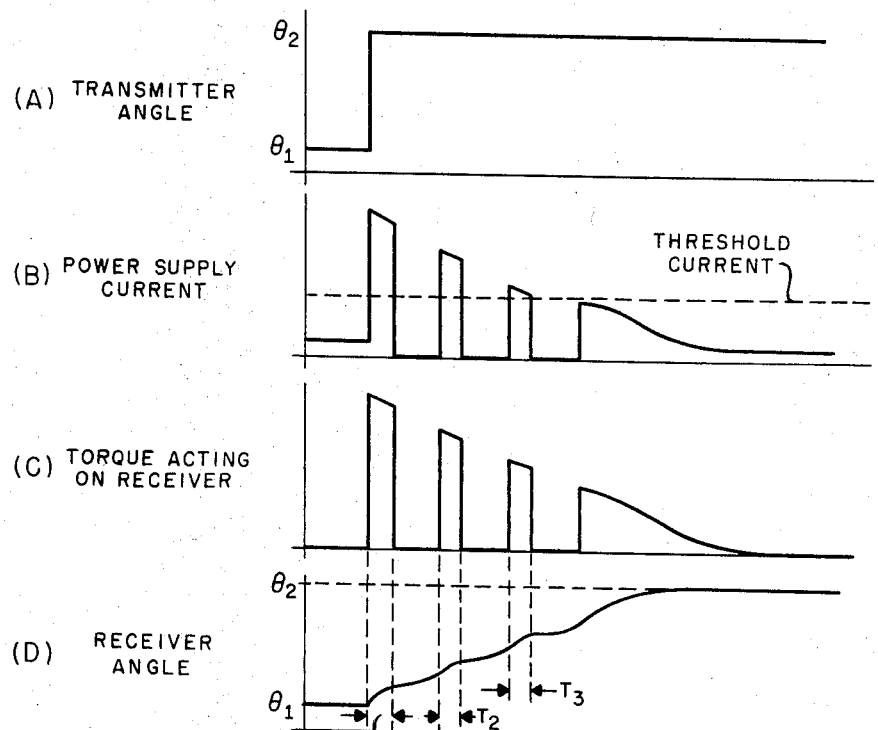
FIG. 2 is a composite graph showing in portion A, the transmitter angle; in portion B, the power supply current; portion C, the torque acting on the receiver; and in portion D, the receiver angle, all being plotted with respect to time.

In accordance with the present invention, a duty cycle current limiting circuit 23 is connected to the power amplifiers 16 and 17, the lead 24 and the D.C. power supply 22 to act as a current sensitive electronic switch to monitor overload and failure conditions for selectively connecting the D.C. power supply 22 to the power amplifiers 16 and 17, in a manner to be described with respect to FIG. 2.

Referring now to the graph of FIG. 2, assuming a step change in the angle of the transmitter rotor 13 from an angle of $\theta_1$ to $\theta_2$ as shown in the graph A in FIG. 2, the current drawn by the power amplifiers 16 and 17 may exceed a preselected threshold as indicated by the horizontal dash line with respect to the power supply current graph B. Responding to this overload condition, the duty cycle current limiter circuit 233 of FIG. 1 will hold the electronic switch closed to provide power from the D.C. power supply 22 to the power amplifiers 16 and 17 for a predetermined time period which will not permit injury to the electronic components of the system 10. At the end of the predetermined time period defined by the circuit 23, the electronic switch will open for a second predetermined time period thereby cutting off power to the power amplifiers 16 and 17 as indicated by the abrupt fall time on the first step of the power supply current graph B. During the time the power supply 22 provides current to the power amplifiers 16 and 17, the receiver 12 has a torque acting on its rotor winding 21 as shown in the graph C of FIG. 2 thereby causing the rotor 21 of the receiver 12 to tend to align itself with the position of the rotor 13 of the rotor 11, as shown in the graph D of FIG. 2.

With the electronic switch now open and current cut-off from the power amplifiers 16 and 17, there is no torque acting on the receiver rotor 21. However, due to its inertia, it continues to rotate in a direction tending to align itself with the rotor 13 as shown in the graph D of FIG. 2. After the second predetermined time interval has elapsed, the duty cycle current limiting circuit 23 again closes the electronic switch which connects the D.C. power supply 22 to the power amplifiers 16 and 17 thus providing a second pulse of current as shown in the graph B of FIG. 2 to again provide a torque on the receiver rotor 21 as shown in graph C of FIG. 2. This again causes the receiver rotor 21 to be driven towards the aligned position with respect to the rotor 13 of the transmitter 11. At the end of the predetermined time period, if the current still exceeds the threshold values for the necessary length of time, the electronic switch will again open. This cycle will be repeated until the current is less than the threshold current at which time the electronic switch will remain closed and the rotor 21 of the receiver 12 will come into exact alignment with the rotor 13 of the transmitter 11.

The usefulness of the above current limiting feature in the presence of overload can be appreciated by considering the average power dissipation. By utilizing the duty cycle current limiting circuit of the present invention, the average power rating of the power amplifiers 16 and 17 can be reduced. For example, in one application, the maximum power conditions occur when the current is just below the threshold value which may be assumed to be one ampere for purposes of example. Further, it will be assumed that if the power amplifiers 16 and 17 draw more than one ampere for one second, the electronic switch opens for two seconds. At the end of two seconds, the electronic switch again closes and the cycle can be repeated if the current still remains above the threshold value. Under these conditions, if the power supply voltage is 35 volts, the average power is approximately 35 watts which is safe for the electronic components. If the current were to exceed one ampere, the duty cycle mode would be initiated and one ampere would flow for one second out of three thereby providing an average power of about 12 watts. Thus, because of the duty cycle current limited circuit 23 of the present invention, the maximum current consumption is limited to about 35 watts.

Another important consideration concerns matching the inertia characteristics of the rotor 21 of the receiver 12 with the operation of the duty cycle current limiter circuit 23. By properly matching the characteristics of the duty cycle current limiter circuit 23 with the inertia associated with the mass of the rotor 21 and any elements attached thereto, a very efficient peak torque to power input ratio is achieved. Because of the aforementioned mass and the inertia it gains during the "on" portion of the duty cycle, continuous motion of the receiver rotor 21 is possible through the "off" portion as shown in graph D of FIG. 2. It will be noted that the torque acting on the receiver rotor 21 as shown in graph C of FIG. 2 is proportional to the D.C. current to the receiver 12. The equations which govern the receiver motion during the on and off cycles are shown with respect to graph D associated with their corresponding time intervals in which $T_1$, $T_2$ and $T_3$ represent respective time intervals and T=torque in dyne/cms.
J=work in joules, and
F=force in dynes.

In actual operation, the rotor 21 of the receiver 12 will almost simultaneously follow-up any motion of the rotor 13 of the torque transmitter 11. Under these conditions, the D.C. current will normally be less than the current limiter threshold value. Thus, the duty cycle current limiting circuit 23 of the present invention provides a unique feature which is useful during abnormal operating conditions such as initial alignment, loss of transmitter or receiver excitation or in cases where a receiver rotor may be locked in one position. In any of the aforementioned situations, conventional power amplifiers would draw excessive D.C. currents from the power supply which in turn would damage the power output transistors and ultimately damage the D.C. power supply and its transformer. The duty cycle current limiter circuit permits large peak D.C. currents (and corresponding high peak torques) but limits the power dissipation to a safe value for the electronic components.

Figure 3:
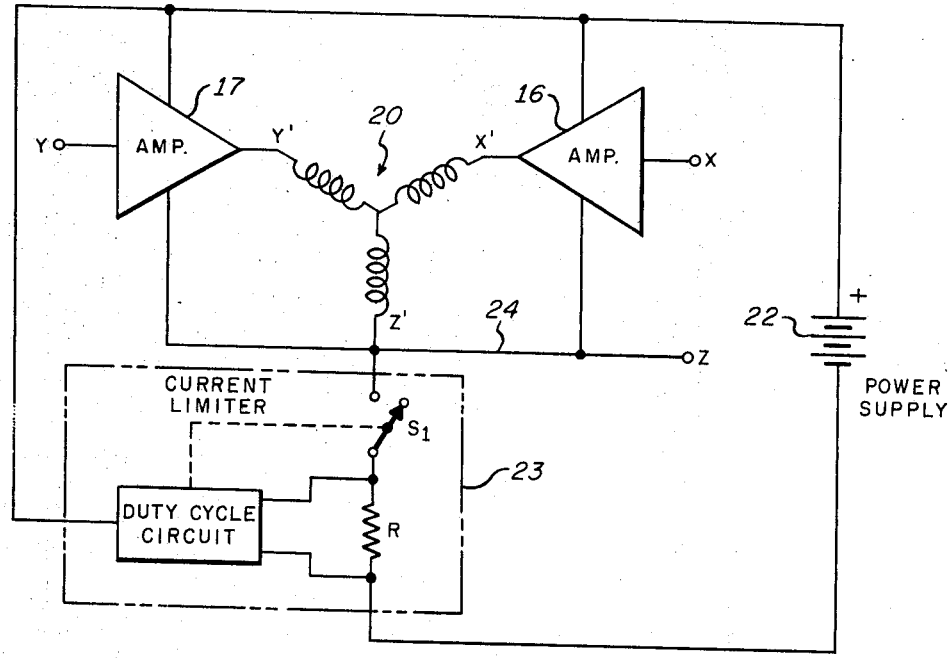
FIG. 3 is a functional schematic diagram showing an embodiment of the present invention.

Referring now to FIG. 3, a schematic wiring diagram showing the functional equivalent of an embodiment of the present invention is disclosed with respect to the synchro data transmitting and receiving system 10 shown in FIG. 1. Like reference numerals will be used throughout to indicate like elements to simplify the explanation. Basically, the current limiting circuit 23 of the present invention senses the voltage developed across a resistor R connected in series with a switch S1 which in turn is connected to the junction of the terminal Z' and the lead 24. The resistor R has its other extremity connected to the minus side of the power supply 22. When the voltage developed across the resistor R exceeds a predetermined magnitude for a certain time period, in a manner to be more fully explained, the switch S1 opens and remains open for a fixed time interval after which it closes again allowing current to flow. If the current still exceeds the preselected value, the cycle is repeated in a manner explained with respect to FIG. 2.

Figure 4:
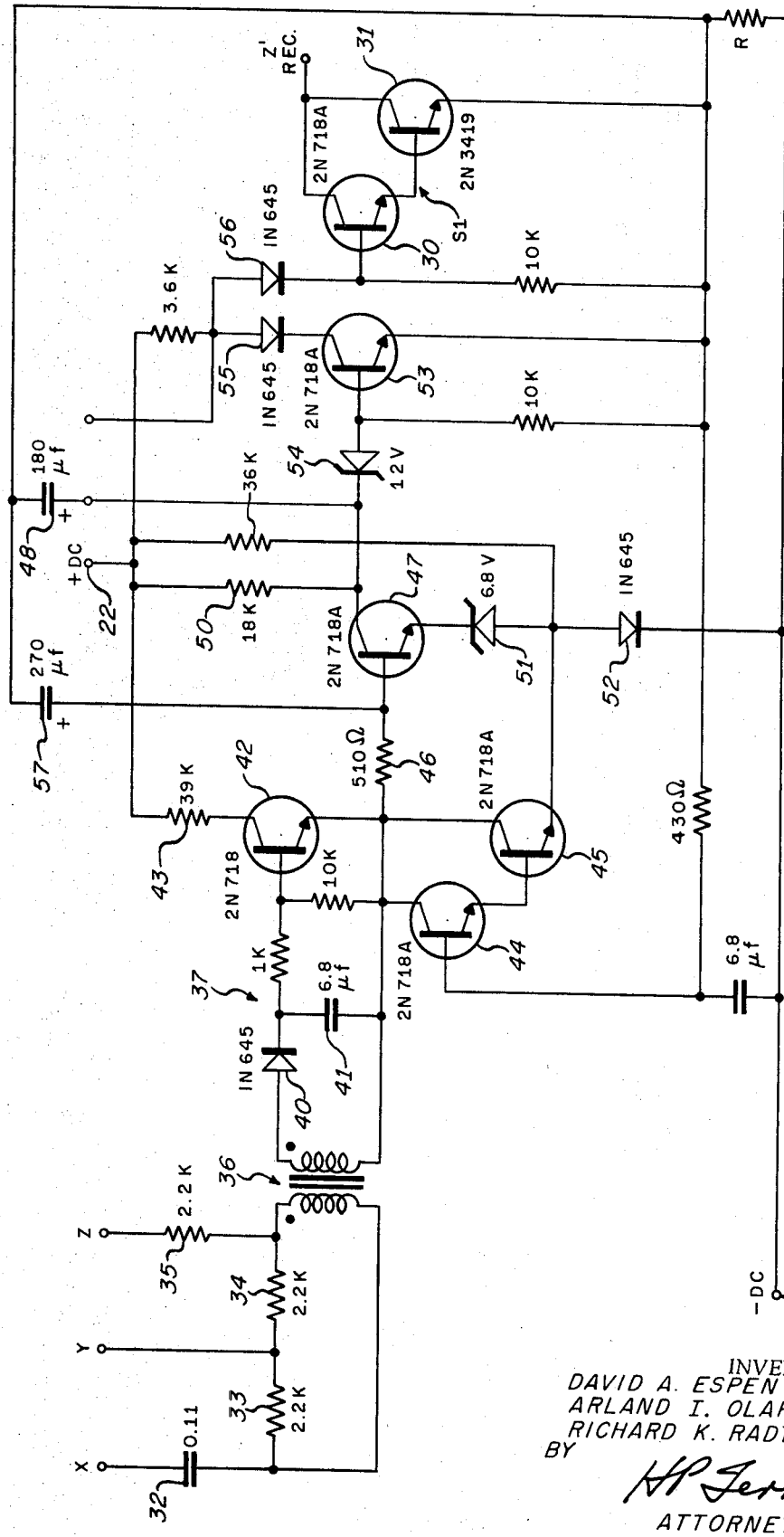
FIG. 4 is a wiring diagram of the embodiment of the overload and failure sensing circuit shown with respect to FIG. 3.

A duty cycle current limiting circuit 23 of the type functionally described with respect to FIG. 3 will now be explained in detail with respect to the wiring diagram of FIG. 4. The resistor R in FIG. 4 is the current sensing resistor and a Darlington transistor pair consisting of transistors 30 and 31 comprise the electronic switch S as explained above with respect to FIG. 3. An input signal is provided from the X, Y and Z terminals of the torque transmitter stator 11. The 400 Hz. A.C. signal on the terminals X, Y and Z is connected via a capacitor 32 and respective resistors 33, 34 and 35 to the input winding of a transformer 36 which has its output winding connected to a rectifying and filtering circuit 37. The value of the capacitor 32 and the three resistors 33, 34 and 35 are such that the 400 Hz. signal across the transformer 36 will have a constant amplitude, variable phase characteristic (provided, of course, the torque transmitter 11 is excited and it has the proper leg to leg voltage). Thus, although the phase of the 400 Hz. signal at the secondary of the transformer 36 will vary with the transmitter rotor position, the amplitude will remain constant. This constant amplitude signal when rectified by a rectifier 40 and filtered by a capacitor 41 of the circuit 37 results in a D.C. voltage which is large enough to turn on and cause saturation of the transistor 42 which has its base responsive to this D.C. voltage. A positive D.C. source 22 is connected to the collector of the transistor 42 via a resistor 43. The negative side of the D.C. source 22 is connected to one extremity of the resistor R, as shown also in FIG. 3.

With a signal being provided from the transmitter 11, the transistor 42 is saturated. With excessive current through the resistor R as determined by the value of its resistance, the interconnected transistors 44 and 45 will saturate. The base of the transistor 44 is responsive to the current through the resistor R and has its emitter connected to the base of the transistor 45. The collectors of the transistors 44 and 45 are connected through a resistor 46 to the base of a transistor 47. When the transistors 44 and 45 saturate, the transistor 47 is turned off and a capacitor 48 which is connected to the collector of the transistor 47 begins to charge through a resistor 50 connected between the positive portion of the D.C. power supply 22 and the collector of the transistor 47. Normally, the transistor 47 provides a discharge path for the capacitor 48 through a Zener diode 51 and a diode 52 connected in series between the emitter of the transistor 47 and the negative side of the power supply 22.

If this condition persists for one second, the voltage of the capacitor 48 will exceed the Zener voltage of the diode 54 thereby saturating the transistor 53 which has its base connected to the diode 54. When the transistor 53 saturates, its collector voltage drops. The collector of the transistor 53 is connected to the base of the transistor 30 via diodes 55 and 56. Dropping of the collector voltage of the transistor 53 turns off the interconnected transistors 30 and 31 thereby effectively opening the switch S1 as shown in FIG. 3 and the amplifiers 16 and 17 will no longer deliver power.

With the transistors 30 and 31 turned off, the current through the resistor R drops to zero thereby turning off the transistors 44 and 45. A capacitor 57 is connected between one extremity of the resistor R and the base of the transistor 47. The emitter of the transistor 42 is also connected via the resistor 46 to the other side of the capacitor 57. Since the transistor 42 is still conducting, the capacitor 57 is now permitted to charge through the resistor 43 and transistor 42. The capacitor 57 is designed such that two seconds later it will have acquired enough voltage to cause the transistor 47 to saturate which in turn turns off the transistor 53. This now causes the transistors 30 and 31 to again be saturated, i.e., closes the switch S1, and current can again flow through the resistor R such that the amplifiers 16 and 17 again deliver power. The above explanation provides one cycle of operation. If subsequent to the two second interval, explained above, the current through the resistor R still exceeds the threshold value for the necessary time interval, this cycle will be repeated as explained above with respect to FIG. 2. The above mode of operation may be considered the duty cycle limiting or overload mode of operation.

The failure mode of operation will now be explained. In the preceding discussion, it was assumed that the transistor 42 was saturated upon the basis that there was a signal provided by the transmitter 11 via the terminals X, Y and Z. If the signal from the transmitter 11 is removed such as during a failure, there would no longer be a signal applied to the base of transistor 42 and it would cease to conduct. This would cause the transistor 47 to cease conduction which in turn would cause the transistor 53 to saturate. This would turn off the transistors 30 and 31 thereby opening the switch S1 with respect to FIG. 3 and the amplifiers 16 and 17 would no longer deliver power. Thus, the transistor 42 also acts to monitor the transmitter signal which is an extremely desirable feature since the loss of the transmitter signal will usually result in excessively high amplifier current.

It will also be appreciated that the transmitter monitoring function has the advantage that the failure mode, under transmitter malfunction, is different from the duty cycle current limiting mode since the amplifiers 16 and 17 will be switched off and will remain off as long as the failure persists. Thus, it is possible to provide a discrete indication and distinguish between receiver and transmitter malfunctions by observing if the amplifiers 16 and 17 are delivering period bursts of power or not.

Figure 5:
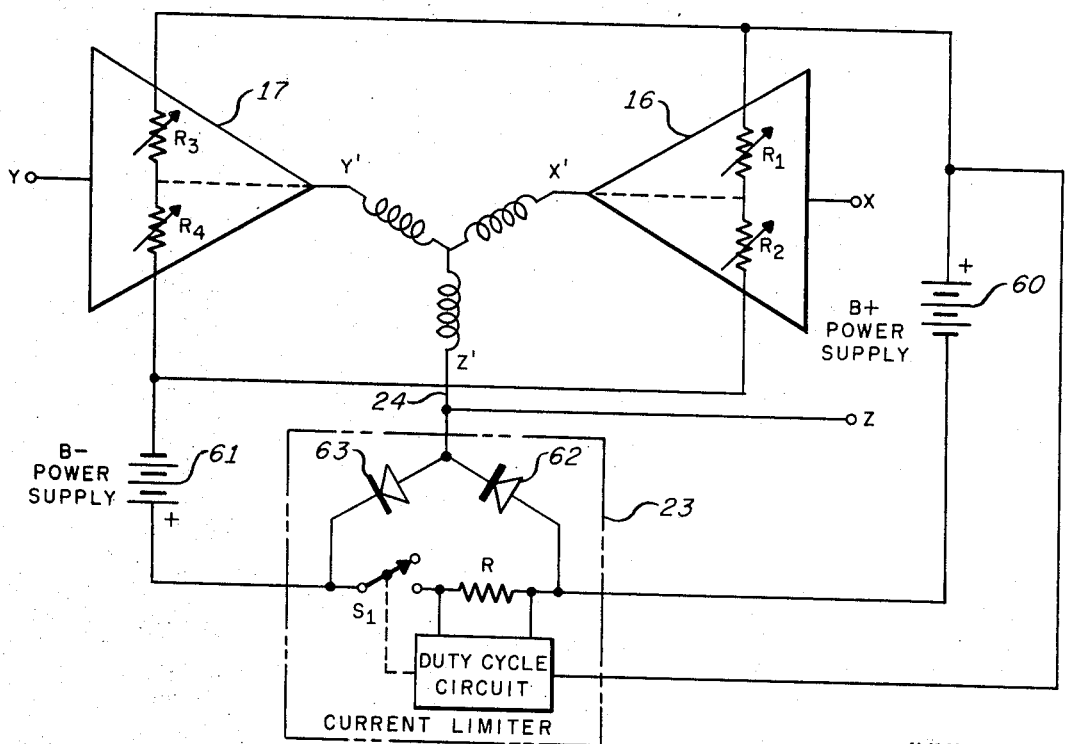
FIG. 5 is a functional schematic diagram of another embodiment of the present invention.

Another embodiment of the duty cycle current limiting circuit of the present invention is shown schematically with respect to FIG. 5. The circuit of FIG. 5 has greater torque capabilities and utilizes a positive and negative split power supply. A positive power supply 60 has its negative side connected to one extremity of the resistor R while a negative power supply 61 has its positive side connected to the switch S1. The resistor R and switch S1 are connected in series. The extremity of the resistor R connected to the negative side of the power supply 60 is also connected to a diode 62 which has its other side connected to the junction of the Z' terminal and the lead 24 and to one extremity of a second diode 63 which has its other side connected to the extremity of the switch S1 that is connected to the positive side of the power supply 61. Because of the positive and negative split power supplies in this embodiment, the sensing and controlling of the power supply current requires a bridge circuit arrangement. The power amplifier 16 has resistors R1 and R2 while the power amplifier 17 has resistors R3 and R4 to provide a simplified representation of the operation of the power amplifiers for observing all the possible current paths. It will be appreciated that all current must flow through the current limiting sensing resistor R and the electronic switch S1.

Figure 6:
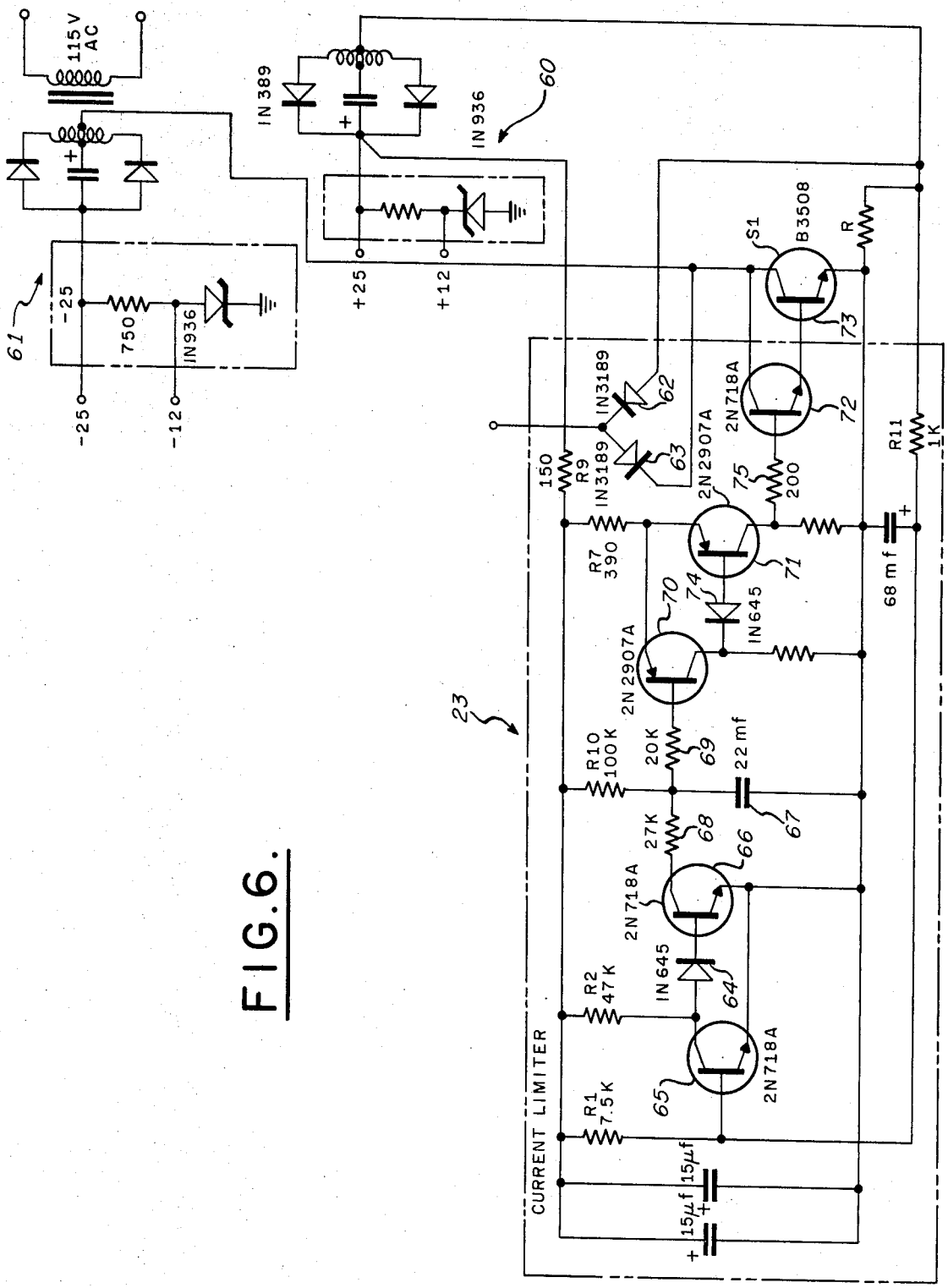
FIG. 6 is a wiring diagram of the embodiment of the overload and failure sensing circuit shown with respect to FIG. 5.

Referring now to FIG. 6, a wiring diagram of the current limiting circuit of FIG. 5 is shown which in operation is basically similar to that shown in FIG. 4 except that one capacitor is used to control both the off and on time intervals of the current limiting circuit 23. As in the above explanation, an excessive current through the resistor R initiates the current limiting cycle. This excessive current will result in transistor 65 which has its base connected to one extremity of resistor R being turned off and transistor 66 saturating. The transistor 65 is normally saturated by current through resistors R1 and R9. The collector of the transistor 65 is connected through a diode 64 to the base of the transistor 66. A capacitor 67 is connected via resistor 68 to the collector of the transistor 66 and is also connected via a resistor 69 to the base of a transistor 70. With the transistor 66 saturated, the capacitor 67 will then begin to discharge through the resistor 68 and the transistor 66 and in one second will reach a voltage such that the transistor 70 will saturate. This in turn will turn off a transistor 71 which has its base coupled via diode 74 to the collector of the transistor 70 and thereby also turn off the Darlington pair of transistors 72 and 73 which constitute the switch S1. The base of the transistor 72 is connected via a resistor 75 to the collector of the transistor 71. The switch S1 as shown in FIG. 5 is now open and the power to the amplifiers 16 and 17 is interrupted. As soon as the transistors 72 and 73 are turned off, the current through the resistor R drops to zero and the transistor 65 again saturates. The transistor 66 is thus turned off and the discharge path for the condenser 67 through the resistor 68 is broken. The capacitor 67 now begins to charge and in two seconds reaches a voltage such that the transistor 70 is turned off which causes the transistor 71 to saturate. The saturation of the transistor 71 allows the transistors 72 and 73 to saturate also thereby closing the switch S1 and delivering power to the amplifiers 16 and 17, as shown in FIG. 5. This cycle will be repeated if excessive current still exists in a manner explained with respect to FIG. 2.

The characteristics and values of the components have been shown in FIGS. 4 and 6 consistent with the explanation given above for purposes of example in explaining the present invention.

While the invention has been described in its preferred embodiment, it is to be understood that the words which have been used are words of description rather than limitation and that changes within the purview of the appended claims may be made without departing from the true scope and spirit of the invention in its broader aspects.

What is claimed:

1. In synchro data transmitting and receiving apparatus having a receiver with a positionable member having an inertia characteristic, the improvement comprising,
    signal sensing means coupled to said transmitting and receiving apparatus and responsive to the signal transmitted therebetween,
    threshold detecting means coupled to said signal sensing means for providing an overload signal when said transmitted signal exceeds a predetermined threshold value, and signal interrupting means coupled to said threshold detecting means and to said transmitting and receiving apparatus for cyclically interrupting said transmitted signal during overload conditions in which the duration of the cycle during which said transmitted signal is interrupted is related to said inertia characteristic of said member and to the characteristics of components of said apparatus whereby an efficient peak torque to power input ratio is maintained to provide continuous response to the transmitted signal during overload conditions without damaging said components.

2. In synchro data transmitting and receiving apparatus having a receiver with a positionable member having an inertia characteristic, the improvement comprising signal sensing means coupled to said transmitting and receiving apparatus and responsive to the signal transmitted therebetween, and duty cycle limiting means including switch means coupled to said signal sensing means for interrupting said transmitted signal during overload conditions, said duty cycle limiting means further including electronic storage means connected in controlling relation to said switch means for defining a first interim during which said transmitted signal is effective with respect to said receiver and a second interim during which it is interrupted during said overload conditions, said duty cycle limiting means being arranged to define said first and second interims to achieve efficient peak torque to power input ratio consistent with said inertia characteristic of said member without damaging the apparatus.

3. In apparatus of the character recited in claim 2 in which said duty cycle limiting means further includes additional switch means responsive to said transmitted signal for discretely sensing system failure in the absence of said transmitted signal.

4. In apparatus of the character recited in claim 3 in which said duty cycle limiting means provides current limiting during overload conditions in accordance with said inertia characteristic of said member to provide continuous response to the transmitted signal during overload conditions.

5. In apparatus of the character recited in claim 4 in which said electronic storage means includes capacitor means having charging and discharging rates in accordance with said inertia characteristics of said member and the safe operating limits of components of said apparatus to provide efficient peak torque to power input ratio while safeguarding said components.

6. In apparatus of the character recited in claim 5 in which said signal sensing means comprises resistor means, said duty cycle limiting means includes first switch means for interrupting said transmitted signal during overload conditions and second switch means for discretely monitoring failure conditions, and said electronic storage means includes capacitor means disposed between said first and second switch means for defining said first and second interims.

References Cited
UNITED STATES PATENTS

| | | | |
|---|---|---|---|
| 2,296,436 | 9/1942 | Goddard | 318—23.5 |
| 2,356,186 | 7/1944 | Somers | 318—23.5 |
| 2,401,450 | 6/1946 | Alexanderson | 318—20.545 |
| 2,817,052 | 12/1957 | Knoop | 317—13 X |
| 2,848,668 | 8/1958 | Ramey | 318—23.5 |
| 3,020,462 | 2/1962 | MacGregory | 317—13 X |

THOMAS E. LYNCH, Primary Examiner

U.S. Cl. X.R.

317—13